US012194746B2

(12) United States Patent
Han et al.

(10) Patent No.: US 12,194,746 B2
(45) Date of Patent: Jan. 14, 2025

(54) INKJET PRINTING APPARATUS

(71) Applicant: Samsung Display Co., LTD., Yongin-si (KR)

(72) Inventors: Jeong Won Han, Seongnam-si (KR); Jongho Park, Hwaseong-si (KR); Taeho Yang, Suwon-si (KR); Myung Soo Huh, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 117 days.

(21) Appl. No.: 17/974,633

(22) Filed: Oct. 27, 2022

(65) Prior Publication Data

US 2023/0264475 A1 Aug. 24, 2023

(30) Foreign Application Priority Data

Feb. 23, 2022 (KR) ........................ 10-2022-0023624

(51) Int. Cl.

*B41J 2/14* (2006.01)
*B41J 2/055* (2006.01)
*B41J 2/145* (2006.01)
*B41J 2/175* (2006.01)

(52) U.S. Cl.

CPC ............... *B41J 2/145* (2013.01); *B41J 2/055* (2013.01); *B41J 2/14* (2013.01); *B41J 2/175* (2013.01); *B41J 2/17503* (2013.01); *B41J 2002/14362* (2013.01); *B41J 2202/11* (2013.01)

(58) Field of Classification Search

CPC ..... B41J 2/145; B41J 2/055; B41J 2/14; B41J 2/175; B41J 2/17503; B41J 2002/14362; B41J 2202/11

See application file for complete search history.

(56) References Cited

U.S. PATENT DOCUMENTS

| | | | | |
|---|---|---|---|---|
| 9,216,576 | B2 | 12/2015 | Kobayashi et al. | |
| 2012/0069093 | A1* | 3/2012 | Kuwata | B41J 2/055 156/247 |
| 2015/0138282 | A1* | 5/2015 | Kobayashi | B41J 2/055 347/70 |
| 2019/0143709 | A1 | 5/2019 | Tokimatsu | |

FOREIGN PATENT DOCUMENTS

| | | |
|---|---|---|
| JP | 2015-44324 | 3/2015 |
| KR | 10-2009-0003802 | 1/2009 |
| WO | 2018/116562 | 6/2018 |

OTHER PUBLICATIONS

Konica Minolta_KM1024i Series_Spec_website (https://www.konicaminolta.com/inkjet/inkjethead/km1024i/spec.html).

* cited by examiner

*Primary Examiner* — Yaovi M Ameh
(74) *Attorney, Agent, or Firm* — KILE PARK REED & HOUTTEMAN PLLC

(57) ABSTRACT

An inkjet printing apparatus according to an embodiment includes a stage where a target substrate is disposed, and an inkjet head that discharges ink on the target substrate. The inkjet head includes a tank that stores the ink, nozzles that are provided on the tank and discharge the ink, and a damper that is disposed in the tank, and the damper comprises a protruding portion that protrudes toward the nozzles from the damper.

20 Claims, 10 Drawing Sheets

INKJET PRINTING APPARATUS

CROSS-REFERENCE TO RELATED APPLICATION(S)

This application claims priority to and benefits of Korean Patent Application No. 10-2022-0023624 under 35 U.S.C. 119, filed in the Korean Intellectual Property Office on Feb. 23, 2022, the entire contents of which are incorporated herein by reference.

BACKGROUND

(a) Technical Field

The disclosure relates to an inkjet printing apparatus.

(b) Description of the Related Art

A display device is a device that displays a screen, and may include a liquid crystal display (LCD), an organic light emitting diode (OLED) display, and the like. Such a display device may be used in various electronic devices such as portable phones, navigation devices, digital cameras, electronic books, portable game devices, and various terminals.

In the process of manufacturing such a display device, an inkjet printing process may be used to form a layer such as an organic emission layer, a color filter, and the like.

The above information disclosed in this Background section is only for enhancement of understanding of the background of the disclosure, and therefore it may contain information that does not form the prior art that is already known in this country to a person of ordinary skill in the art.

SUMMARY

Embodiments provide an inkjet printing apparatus that may provide particles of a uniform concentration in the discharged ink.

An inkjet printing apparatus according to an embodiment may include a stage where a target substrate may be disposed, and an inkjet head that discharges ink on the target substrate. The inkjet head may include a tank that stores the ink, nozzles that may be provided on the tank and discharge the ink, and a damper that may be disposed in the tank. The damper may include a protruding portion that protrudes toward the nozzles from the damper.

A cross-section of the protruding portion may have at least one of a polygonal shape, a semicircular shape, and an elliptical shape.

The damper may include at least two protruding portions.

The at least two protruding portions may have different heights.

The nozzles may include first nozzles disposed in a first column, second nozzles disposed in a second column, third nozzles disposed in a third column, and fourth nozzles disposed in a fourth column.

The at least two protruding portions may include a first protruding portion disposed between the first nozzle and the second nozzle, a second protruding portion disposed between the second nozzle and the third nozzle, and a third protruding portion disposed between the third nozzle and the fourth nozzle.

A height of the second protruding portion may be higher than a height of the first protruding portion and a height of the third protruding portion.

The first nozzle, the second nozzle, the third nozzle, and the fourth nozzle may be disposed in a first direction, the protruding portion may extend in a second direction, and the first direction and the second direction may be perpendicular.

The protruding portion may include sub-protruding portions spaced apart from each other in the second direction.

The damper may include a first region overlapping the nozzles and a second region other than the first region, and the first region and the second region may form a step difference.

An inkjet printing apparatus according to an embodiment may include a stage where a target substrate may be disposed, and an inkjet head that discharges ink on the target substrate. The inkjet head may include a tank that stores the ink, nozzles that may be provided on the tank and discharge the ink, and a damper provided in the tank and overlapping nozzles. The damper may include a protruding portion protruded from a surface of the damper.

A cross-section of the protruding portion may have at least one of a polygonal shape, a semicircular shape, and an elliptical shape.

The damper may include at least two protruding portions.

The at least two protruding portions may have different heights.

The nozzles may include first nozzles disposed in a first column, second nozzles disposed in a second column, third nozzles disposed in a third column, and fourth nozzles disposed in a fourth column.

The at least two protruding portions may include a first protruding portion disposed between the first nozzle and the second nozzle, a second protruding portion disposed between the second nozzle and the third nozzle, and a third protruding portion disposed between the third nozzle and the fourth nozzle.

A height of the second protruding portion may be higher than a height of the first protruding portion and a height of the third protruding portion.

The first nozzle, the second nozzle, the third nozzle, and the fourth nozzle may be disposed in a first direction, the protruding portion may extend in a second direction, and the first direction and the second direction may be perpendicular.

The protruding portion may include sub-protruding portions spaced apart from each other in the second direction.

The damper may include a first region overlapping the nozzles and a second region other than the first region, and the first region and the second region may form a step difference.

According to the embodiments, an inkjet printing apparatus that provides ink containing particles of uniform concentration can be provided.

DETAILED DESCRIPTION OF THE EMBODIMENTS

Figure 1:
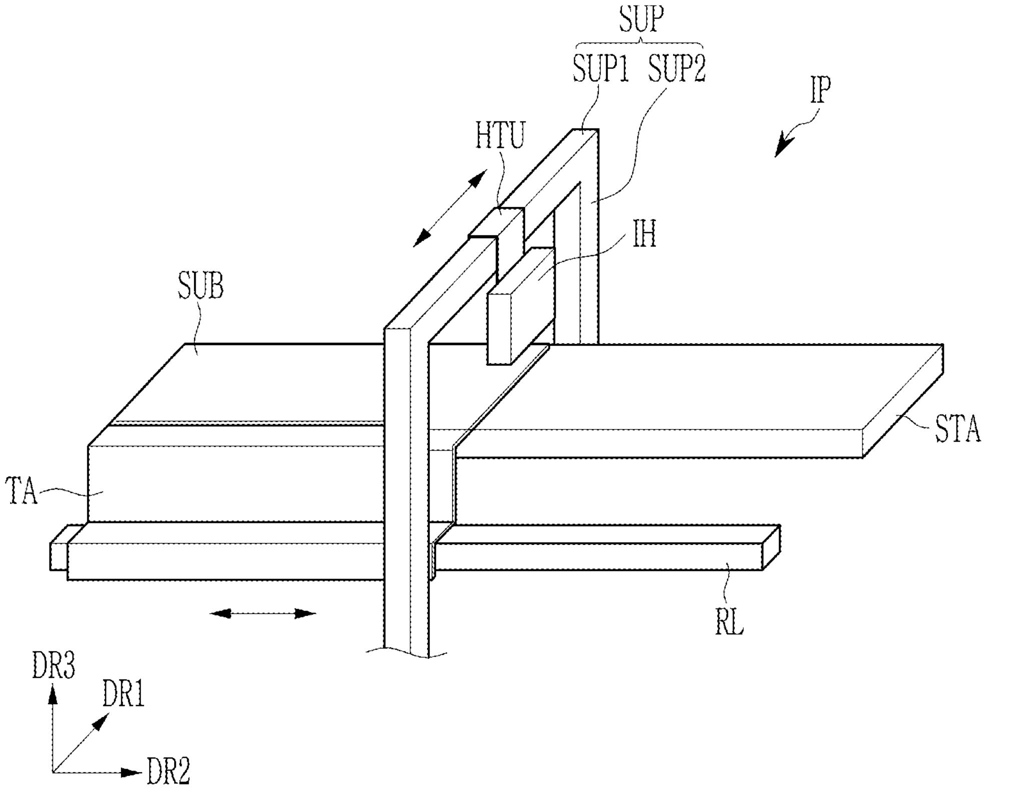
FIG. 1 is a schematic perspective view of an inkjet printing apparatus according to an embodiment.

Hereinafter, with reference to the accompanying drawings, various embodiments of the disclosure will be described in detail such that those of ordinary skill in the art can carry out the disclosure. The disclosure may be implemented in several different forms and is not limited to the embodiments described herein.

In order to clearly explain the disclosure, parts irrelevant to the description are omitted, and the same reference sign is attached to the same or similar constituent elements throughout the specification.

Since the size and thickness of components shown in the drawings may be arbitrarily indicated for better understanding and ease of description, the disclosure is not necessarily limited to the illustrated sizes and thicknesses. In the drawings, the thickness of layers, films, panels, regions, etc., may be exaggerated for clarity.

As used herein, the singular forms, "a," "an," and "the" are intended to include the plural forms as well, unless the context clearly indicates otherwise.

It will be understood that when an element such as a layer, film, region, or substrate is referred to as being "on" another element, it can be directly on the other element or intervening elements may also be present. In contrast, when an element is referred to as being "directly on" another element, there may be no intervening elements present. Further, throughout the specification, the word "on" a target element will be understood to be positioned above or below the target element, and will not necessarily be understood to be positioned "at an upper side" based on an opposite to gravity direction.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that the terms "connected to" or "coupled to" may include a physical or electrical connection or coupling.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
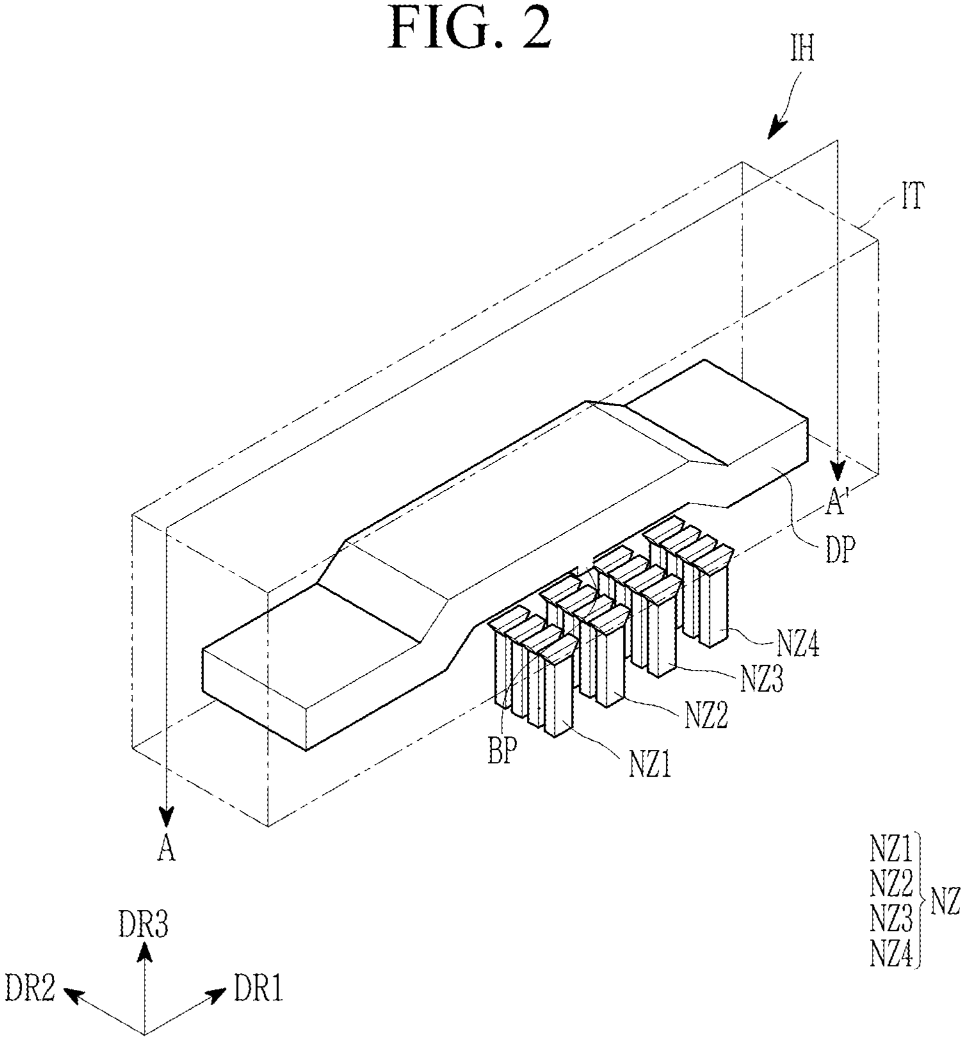
FIG. 2 is a schematic perspective view of an inkjet head according to an embodiment.
Figure 3:
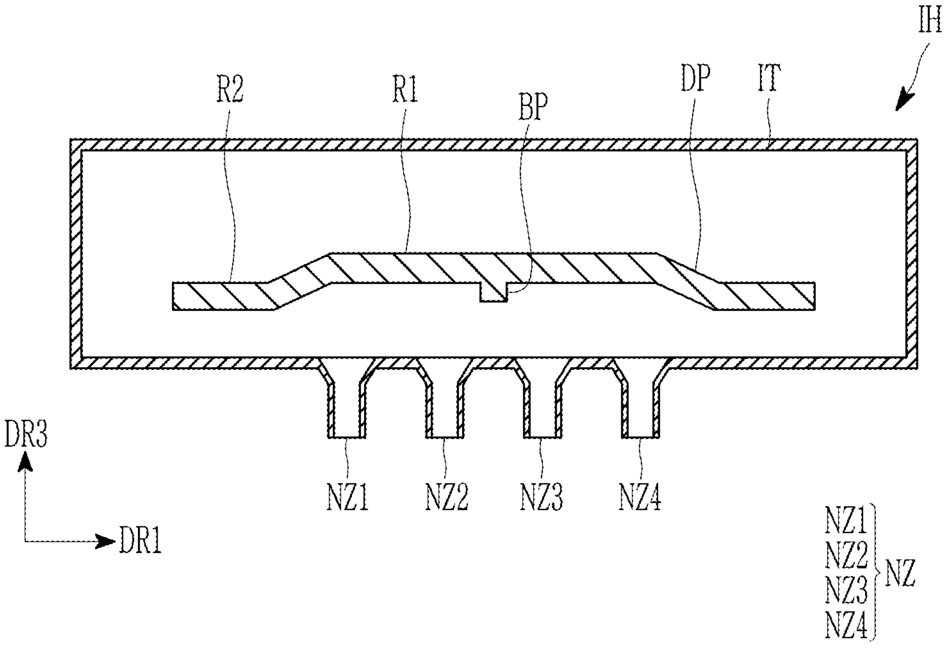
FIG. 3 is a schematic cross-sectional view of FIG. 2, taken along line A-A'.

Hereinafter, referring to FIG. 1 to FIG. 3, an inkjet printing apparatus according to an embodiment will be described. FIG. 1 is a schematic perspective view of an inkjet printing apparatus according to an embodiment, FIG. 2 is a schematic perspective view of an inkjet head according to an embodiment, and FIG. 3 is a schematic cross-sectional view of FIG. 2, taken along line A-A'.

In FIG. 1, a first direction DR1, a second direction DR2, and a third direction DR3 may be defined. The first direction DR1 and the second direction DR2 may be positioned on the same plane and may be perpendicular to each other, and the third direction DR3 may be perpendicular to the first direction DR1 and the second direction DR2, respectively.

Referring to FIG. 1, an inkjet printing apparatus IP according to an embodiment may include a stage STA, a substrate transfer member TA coupled with a target substrate SUB provided on the stage STA, and an inkjet head IH. The inkjet printing apparatus IP may further include a support SUP and a head transfer unit HTU connected to the inkjet head IH.

The stage STA may include a portion with a plate shape in which the target substrate SUB may be disposed. The stage STA may have an overall rectangular shape, but is not limited thereto, and may be changed according to the shape of the provided target substrate SUB.

The stage STA according to an embodiment may include floating holes for floating the target substrate SUB, but is not limited thereto. The floating holes may spray air or suck air. In case that air is sprayed from the floating hole, the target substrate SUB may float by the pressure of the air. The target substrate SUB may be floated apart from the stage STA at an interval. In case that air is sucked from the floating hole, the target substrate SUB can be fixed on the stage STA by the air pressure.

The inkjet printing apparatus IP according to an embodiment may include the substrate transfer member TA for fixing and moving the target substrate SUB. The substrate transfer member TA may move along a rail RL to which the substrate transfer member TA may be connected. It may be possible to move the substrate transfer member TA and the connected target substrate SUB.

Although not shown, a driver (not shown) for generating a driving force for moving the substrate transfer member TA may be provided. The driver may move the substrate transfer member TA by generating a driving force with mechanical force, electric force, magnetic force, or combinations thereof.

The inkjet printing apparatus IP may include an inkjet head IH as shown in FIG. 2. The inkjet printing apparatus IP may spray ink on the target substrate SUB using the inkjet head IH.

The inkjet head IH may be spaced apart from the stage STA by an interval. The interval at which the inkjet head IH may be spaced apart from the stage STA can be adjusted by a height of a support SUP.

The inkjet head IH may spray ink on the target substrate SUB that may be disposed on top of the stage STA. According to an embodiment, the inkjet head IH may move in a first direction DR1 on a first support SUP1, and the inkjet head IH may move to a specific position to spray ink on the top of the target substrate SUB.

The inkjet head IH may move in the first direction DR1 where the first support SUP1 may be extended. The inkjet head IH may spray ink on the upper part of the target substrate SUB in the first direction DR1.

In an embodiment, the ink may be provided in a solution or colloidal state. For example, the solvent may be acetone, water, alcohol, toluene, propylene glycol (PG), and/or propylene glycol methyl acetate (PGMA), but is not limited thereto.

The support SUP may include the first support SUP1 extended in the first direction DR1 and a second support SUP2 connected to the first support SUP1 and extended in a third direction DR3 that may be a vertical direction.

The head transfer unit HTU may be mounted on the first support SUP1, and may include a head moving unit that can move in a direction (i.e., first direction) and a head fixing unit that may be disposed on a lower surface of the head moving unit and connected to the inkjet head IH. The inkjet head IH may be fixed to the head fixing part and may be moved in the first direction DR1 together with the head moving part.

Hereinafter, referring to FIG. 2 to FIG. 3, the inkjet head IH according to an embodiment will be described in more detail.

According to an embodiment, the inkjet head IH may include a tank IT for storing ink, and a nozzle NZ and a damper DP for discharging ink to the outside of the inkjet head IH.

The tank IT may store ink discharged to the substrate SUB mounted on the stage STA. The ink stored in the tank IT may have a flow in a direction. Although it is not illustrated, the tank IT may include at least one ink injection hole and at least one ink outlet. The tank IT according to an embodiment is shown as one space, but is not limited thereto, and various embodiments that are divided into multiple spaces may be possible.

The inkjet head IH may include nozzles NZ connected to a bottom surface of the inkjet head IH, particularly a bottom surface of the tank IT. Ink may be sprayed onto the target substrate SUB through the nozzles NZ. The ink discharged from the nozzles NZ can be sprayed on the target substrate SUB provided on the stage STA. The nozzles NZ may be positioned on the bottom surface of the inkjet head IH and arranged in a direction in which the inkjet head IH extends.

The nozzles NZ according to an embodiment may include a first nozzle NZ1, a second nozzle NZ2, a third nozzle NZ3, and a fourth nozzle NZ4 disposed in the first direction DR1. The nozzle NZ may include first nozzles NZ1, second nozzles NZ2, third nozzles NZ3, and fourth nozzles NZ4. The first nozzles NZ1 may be disposed in a second direction DR2, and the second nozzles NZ2 may be disposed in a second direction DR2. The third nozzles NZ3 may be disposed in the second direction DR2, and the fourth nozzles NZ4 may be disposed in the second direction DR2. The specification describes and shows the first to fourth nozzles, but embodiments are not limited to this number.

The inkjet head IH according to an embodiment may include a damper DP overlapping the nozzles NZ. The internal pressure in the tank IT may be adjusted to a pressure through the damper DP.

The damper DP according to an embodiment may include a first region R1 and a second region R2 other than the first region R1 overlapping nozzles NZ. The first region R1 may be disposed at a relatively high position in the third direction DR3 compared to the second region R2. The second region R2 may be disposed to a position that may be relatively lower than that of the first region R1. The first region R1 and the second region R2 may be connected in a curved shape. In other embodiments, the first region R1 and the second region R2 may have a step difference. However, the damper DP is not limited to this shape, and the first region R1 and the second region R2 may be deformed to have a flat shape or other shapes.

The damper DP according to an embodiment may include a protruding portion BP protruded from the bottom surface of the damper DP.

Figure 4:
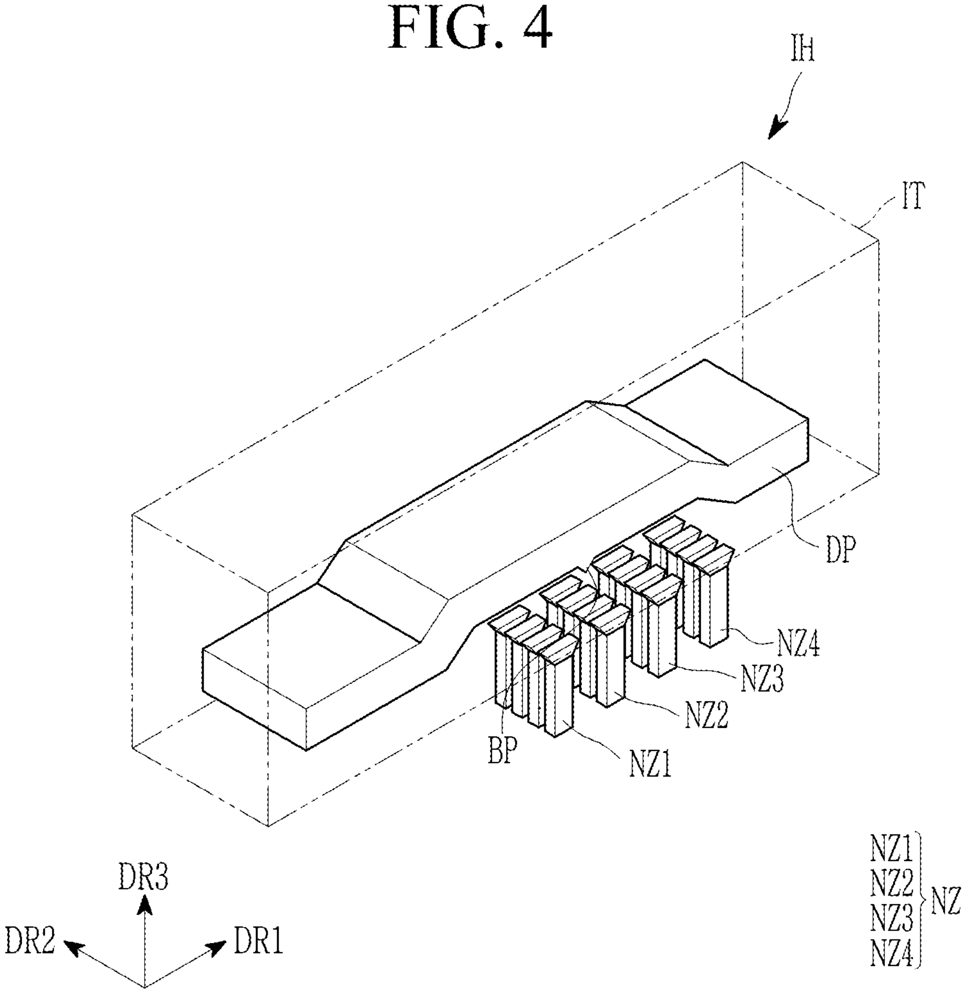
FIG. 4 and FIG. 5 are schematic perspective views of an inkjet head according to an embodiment.
Figure 5:
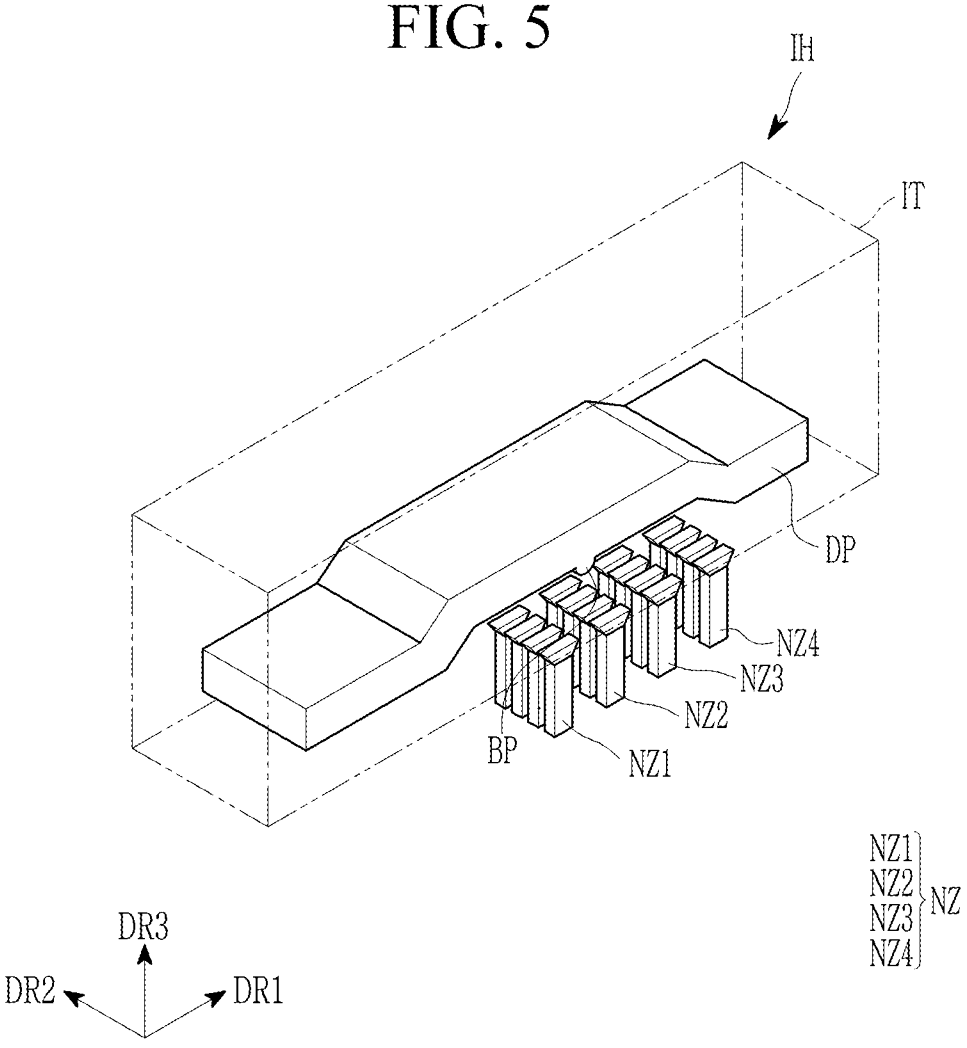

As shown in FIG. 2 and FIG. 3, the cross-section of the protruding portion BP may have a rectangular shape, but is not limited thereto, and as shown in FIG. 4, the cross-section of the protruding portion BP may be triangular, or as shown in FIG. 5, the cross-section of the protruding portion BP may have a semicircular shape. The disclosure is not limited thereto, and the cross-section shape of the protruding portion BP may be modified into various polygonal shapes, parabolic shapes, and the like.

Figure 6:
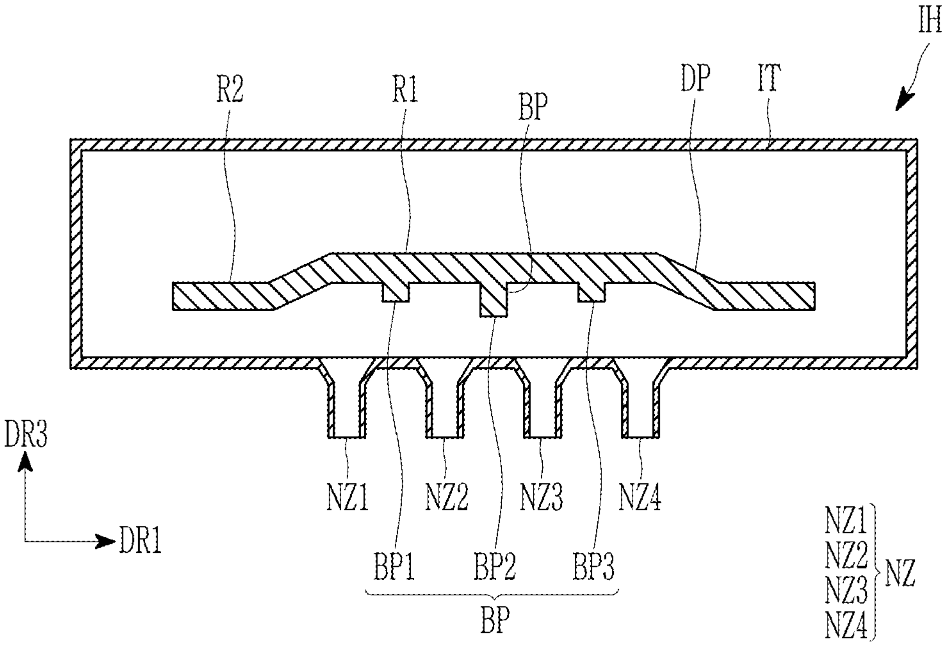
FIG. 6 and FIG. 7 are schematic cross-sectional views of the inkjet head according to an embodiment.

The protruding portion BP may have a shape extending in the second direction DR2. The protruding portion BP may be formed as one body in the second direction DR2, or as shown in FIG. 6, sub-protruding portions may be spaced apart in the second direction DR2.

The protruding portion BP according to an embodiment may be disposed between the second nozzle NZ2 and the third nozzle NZ3. Among the nozzles NZ, the second nozzles NZ2, and the third nozzles NZ3 positioned relatively inward (inside) may have a relatively small amount of particles contained in the discharged ink. However, since the inkjet head IH according to an embodiment includes the protruding portion BP, the amount of particles contained in the ink discharged from the first nozzle NZ1 and the fourth nozzle NZ4 and the amount of particles contained in the ink discharged from the second nozzle NZ2 and the third nozzle NZ3 may be provided uniformly.

A height of the protruding portion BP according to an embodiment may be greater than about 0 and less than about 0.6 mm. In case that the height of the protruding portion BP is about 0.6 mm or more, the amount of particles discharged through the second nozzle NZ2 and the third nozzle NZ3 may increase. For example, the amount of particles discharged from nozzles NZ may be non-uniform.

Figure 7:
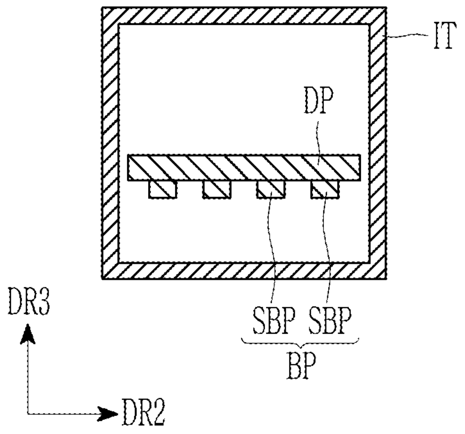

Hereinafter, referring to FIG. 4 to FIG. 7, an inkjet head according to an embodiment will be described. FIG. 4 and FIG. 5 are schematic perspective views of an inkjet head according to an embodiment, and FIG. 6 and FIG. 7 are schematic cross-sectional views of the inkjet head according to an embodiment. A description of the above-described constituent elements and the same constituent elements will be omitted.

As shown in FIG. 4, the protruding portion BP according to an embodiment may have a triangular shape, or as shown in FIG. 5, the protruding portion BP according to an embodiment may have a semicircular shape. However, embodiments are not limited to this shape, and the protruding portion BP may be deformed into various shapes such as a polygonal shape and a parabolic shape.

As shown in FIG. 7, the protruding portion BP according to an embodiment may include sub-protruding portions SBP spaced apart in a second direction DR2. Each of the sub-protruding portions SBP may be disposed to overlap an adjacent nozzle NZ. The sub-protruding portions SBP may have the same number as the number of nozzles NZ disposed in the second direction DR2. As an example, the specification shows an embodiment in which the four nozzles NZ may be disposed in the second direction DR2, and the four sub-protruding portions SPB may be disposed in the second direction DR2. However, the disclosure is not limited thereto, and the protruding portion BP according to an embodiment may include two or more sub-protruding portions SBP. For example, one sub-protruding portion SBP may be disposed to overlap at least one or more nozzles NZ.

Next, referring to FIG. 6, a damper DP according to an embodiment may include at least two protruding portions BP. The protruding portions BP may include a first protruding portion BP1 positioned between the first nozzle NZ1 and the second nozzle NZ2, a second protruding portion BP2 positioned between the second nozzle NZ2 and the third nozzle NZ3, and a third protruding portion BP3 positioned between the third nozzle NZ3 and the fourth nozzle NZ4.

A height of the first protruding portion BP1 to the third protruding portion BP3 according to an embodiment may be different. Specifically, the height of the first protruding portion BP1 and the third protruding portion BP3 may be smaller than a height of the second protruding portion BP2. The height of the second protruding portion BP may be greater than the height of the first protruding portion BP1 and the height of the third protruding portion BP3.

The ink discharged from the second nozzle NZ2 and the third nozzle NZ3 positioned relatively inward may be affected by the second protruding portion BP2. As the height of the second protruding portion BP2 may be relatively high, the amount of particles included in the ink discharged from the second nozzle NZ2 and the third nozzle NZ3 may increase compared to the case where the second protruding portion BP2 may not be present. Accordingly, the amount of particles (e.g., scatterers, quantum dots, etc.) included in the ink discharged through the first nozzle NZ1 to the fourth nozzle NZ4 may be uniformly provided.

Figure 8:
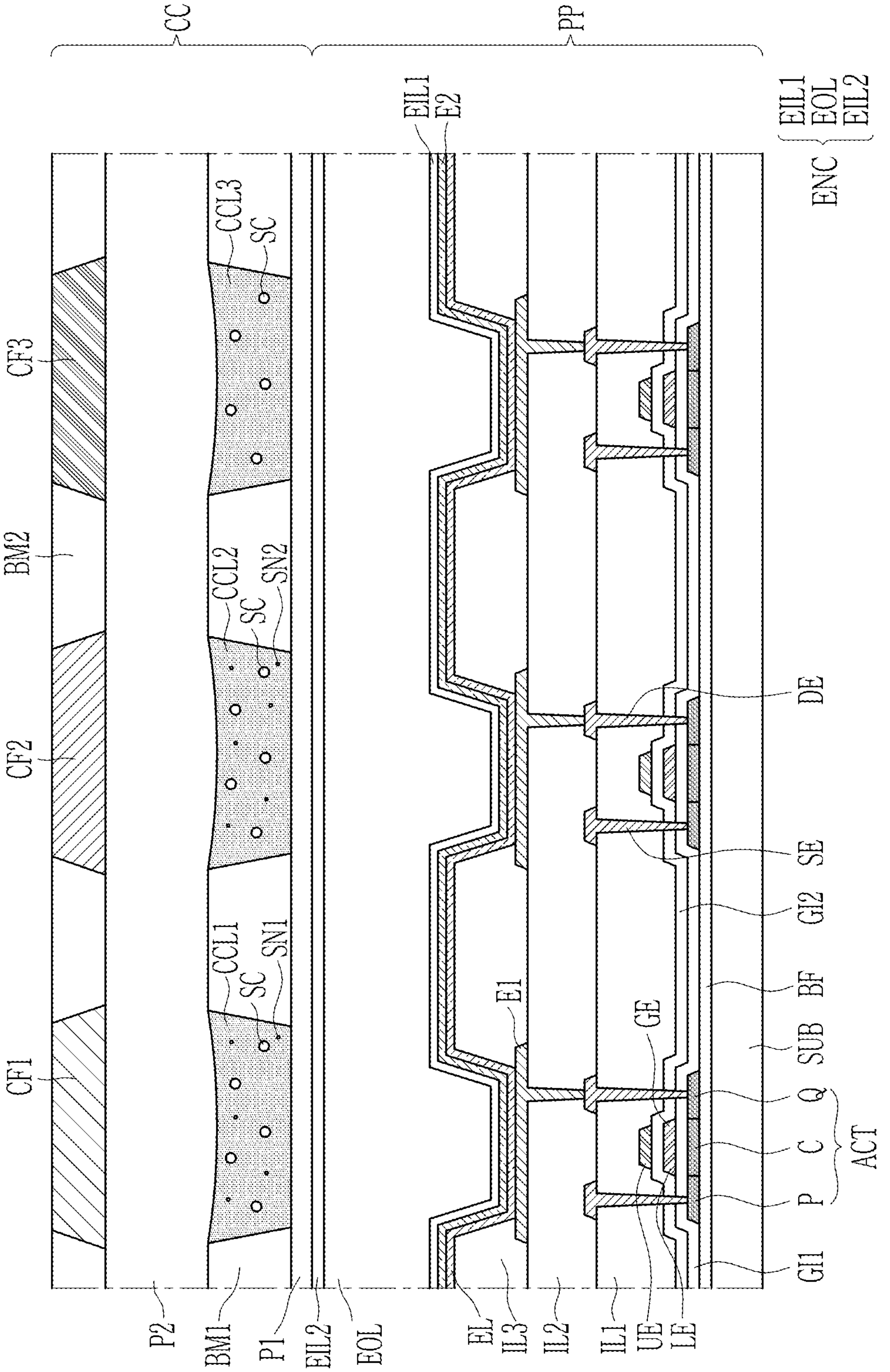
FIG. 8 is a schematic cross-sectional view of a display panel manufactured by using the inkjet printing apparatus according to an embodiment.

Hereinafter, referring to FIG. 8, a display panel manufactured by using the inkjet printing apparatus according to an embodiment will be described. FIG. 8 is a schematic cross-sectional view of a display panel.

Referring to FIG. 8, a color converter CC may be positioned on a pixel portion PP.

The pixel portion PP according to an embodiment may include a substrate SUB. The substrate SUB may include an inorganic insulating material such as glass or an organic insulating material such as plastic such as polyimides (PI). The substrate SUB can be single-layered or multi-layered. The substrate SUB may have a structure in which at least one base layer containing a polymer resin and at least one inorganic layer may be alternately stacked on each other.

The substrate SUB may have various degrees of flexibility. The substrate SUB may be a rigid substrate or a flexible substrate capable of bending, folding, or rolling.

A buffer layer BF may be positioned on the substrate SUB. The buffer layer BF may include an inorganic insulating material or an organic insulating material such as a silicon nitride or a silicon oxide. A part or all of the buffer layer BF may be omitted.

A semiconductor layer ACT may be positioned on the buffer layer BF. The semiconductor layer ACT may include at least one of polysilicon and an oxide semiconductor. The semiconductor layer ACT may include a channel region C, a first region P, and a second region Q. The first region P and the second region Q may be respectively disposed on both sides of the channel region C. The channel region C may include a semiconductor doped with a small amount of impurity or undoped with an impurity, and the first region P and the second region Q may include a semiconductor doped with a large amount of an impurity compared to the channel region C. The semiconductor layer ACT may be formed of an oxide semiconductor. In this case, a separate protective layer (not shown) may be added to protect the oxide semiconductor material, which may be vulnerable to external environments such as a high temperature.

A first gate insulation layer GI1 may be positioned on the semiconductor layer ACT.

A gate electrode GE and a lower electrode LE may be positioned on the first gate insulation layer GI1. Depending on embodiments, the gate electrode GE and the lower electrode LE may be integrally formed with each other. The gate electrode GE may overlap the channel region C of the semiconductor layer ACT.

A second gate insulation layer GI2 may be positioned on the gate electrode GE and the first gate insulation layer GI1. The first gate insulation layer GI1 and the second gate insulation layer GI2 may be single-layered or multi-layered including at least one of a silicon oxide ($SiO_x$), a silicon nitride ($SiN_x$), and a silicon oxynitride ($SiO_xN_y$).

An upper electrode UE may be positioned on the second gate insulation layer GI2. The upper electrode UE may form a sustain capacitor while overlapping the lower electrode LE.

A first interlayer insulation layer IL1 may be positioned on the upper electrode UE. The first interlayer insulation layer IL1 may be single-layered or multi-layered including at least one of a silicon oxide ($SiO_x$), a silicon nitride ($SiN_x$), and a silicon oxynitride ($SiO_xN_y$).

A source electrode SE and a drain electrode DE may be positioned on the first interlayer insulation layer IL1. The source electrode SE and the drain electrode DE may be electrically connected to the first region P and the second region Q of the semiconductor layer ACT through contact holes formed in the insulation layers, respectively.

The second interlayer insulation layer IL2 may be positioned on the first interlayer insulation layer IL1, the source electrode SE, and the drain electrode DE. The second interlayer insulation layer IL2 may include an organic insulating material such as general-purpose polymers such as poly(methyl methacrylate) (PMMA) or polystyrene (PS), polymer derivatives with phenolic groups, acryl-based polymers, imide-based polymers, polyimides, acryl-based polymers, siloxane-based polymers, and the like, or a combination thereof.

A first electrode E1 may be positioned on the second interlayer insulation layer IL2. The first electrode E1 may be connected to the drain electrode DE through a contact hole of the second interlayer insulation layer IL2.

The first electrode E1 may include a metal such as silver (Ag), lithium (Li), calcium (Ca), aluminum (Al), magnesium (Mg), or gold (Au), or may include a transparent conductive oxide (TCO) such as an indium tin oxide (ITO), an indium zinc oxide (IZO), and the like, or a combination thereof.

The first electrode E1 may be formed of a single layer including a metallic material or a transparent conductive oxide, or a multi-layer including the same. For example, the first electrode E1 may have a triple layer structure of indium tin oxide (ITO)/silver (Ag)/indium tin oxide (ITO).

A transistor formed of the gate electrode GE, the semiconductor layer ACT, the source electrode SE, and the drain electrode DE may be connected to first electrode E1 to supply a current to a light emitting element.

A partitioning wall or bank IL3 may be positioned on the second interlayer insulation layer IL2 and the first electrode E1. Although not shown, a spacer (not shown) may be positioned on the bank IL3. The bank IL3 may have a bank opening that overlaps at least a portion of the first electrode E1 and defines a light emitting region.

The bank IL3 may include an organic insulating material such as general-purpose polymers such as poly(methyl methacrylate) (PMMA) or polystyrene (PS), polymer derivatives with phenolic groups, acryl-based polymers, imide-based polymers, polyimides, acryl-based polymers, siloxane-based polymers, and the like, or a combination thereof.

A light emitting unit EL and a second electrode E2 may be positioned on the bank IL3. The light emitting unit EL may include at least one emission layer.

The first electrode E1, the light emitting unit EL, and the second electrode E2 may form a light emitting element. Here, the first electrode E1 may be an anode that is a hole injection electrode, and the second electrode E2 may be a cathode that is an electron injection electrode. However, the disclosure is not limited thereto, and depending on the driving method of the light emitting display device, the first electrode E1 may become a cathode and the second electrode E2 may become an anode.

An encapsulation layer ENC may be positioned on the second electrode E2. The encapsulation layer ENC may cover and seal not only a top surface of the light emitting element, but also side surfaces. Since the light emitting element may be very vulnerable to moisture and oxygen, the encapsulation layer ENC seals the light emitting element to block the inflow of external moisture and oxygen.

The encapsulation layer ENC may include layers, among which the encapsulation layer ENC may be formed as a composite film including both an inorganic layer and an organic layer. For example, it may be formed as a triple layer in which a first encapsulation layer EIL1, an encapsulation organic layer EOL, and a second encapsulation inorganic layer EIL2 may be sequentially formed.

The color converter CC may be positioned on the encapsulation layer ENC.

The color converter CC may include a first insulation layer P1 positioned on the encapsulation layer ENC. A first light blocking layer BM1 may be positioned on the first insulation layer P1. The first light blocking layer BM1 may define a region in which a first color conversion layer CCL1, a second color conversion layer CCL2, and a transmissive layer CCL3 may be positioned.

The first color conversion layer CCL1, the second color conversion layer CCL2, and the transmissive layer CCL3 may be positioned in a region defined by the first light blocking layer BM1. The first color conversion layer CCL1, the second color conversion layer CCL2, and the transmissive layer CCL3 may be formed by an inkjet process, for example, by using the inkjet printing apparatus IP described above. Since the inkjet printing apparatus IP according to an embodiment can provide a uniform amount of scatterers SC over pixels or provide uniform amounts of quantum dots SN1 and SN2, it provides pixels with uniform luminance.

The transmissive layer CCL3 transmits light of a first wavelength incident from the light emitting element, and may include scatterers SC. In this case, a maximum light emitting peak wavelength of light of the first wavelength may be about 380 nm to about 480 nm, for example, about 420 nm or more, about 430 nm or more, about 440 nm or more, or about 445 nm or more, and about 470 nm or less or about 460 nm or less, or may be blue light of which a maximum light emitting peak wavelength may be about 455 nm or less.

The first color conversion layer CCL1 may color-convert light of a first wavelength incident from the light emitting element into red light, and may include scatterers SC and first quantum dots SN1. In this case, the red light may have a maximum light emitting peak wavelength of about 600 nm to about 650 nm, for example, about 620 nm to about 650 nm.

The second color conversion layer CCL2 may color-convert light of a first wavelength incident from the light emitting element into green light, and may include scatterers SC and second quantum dots SN2. Green light may have a maximum light emitting peak wavelength of about 500 nm to about 550 nm, for example, about 510 nm to about 550 nm.

The scatterers SC may scatter light incident on the first color conversion layer CCL1, the second color conversion layer CCL2, and the transmissive layer CCL3 to increase light efficiency.

The first quantum dot SN1 and the second quantum dot SN2 (hereinafter, also referred to as semiconductor nanocrystals) may each independently include a group II-VI compound, a group III-V compound, a group IV-VI compound, a group IV element or compound, a group I-ITT-VI element or compound, a group II-III-VI element or compound, a group I-TI-IV-VI element or compound, or a combination thereof. The quantum dot may not contain cadmium.

The group II-VI compound may be selected from a group consisting of a binary compound selected from the group consisting of CdSe, CdTe, ZnS, ZnSe, ZnTe, ZnO, HgS, HgSe, HgTe, MgSe, MgS, and a mixture thereof; a group consisting of a ternary element compound selected from the group consisting of AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; a group consisting of a quaternary element compound selected from HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The II-VI compound may further include a group III metal.

The group III-V compound may be selected from a group consisting of a binary compound selected from a group consisting of GaN, GaP, GaAs, GaSb, AlN, AlP, AlAs, AlSb, InN, InP, InAs, InSb, and a mixture thereof; a ternary element compound selected from a group consisting of GaNP, GaNAs, GaNSb, GaPAs, GaPSb, AlNP, AlNAs, AlNSb, AlPAs, AlPSb, InGaP, InNP, InNAs, InNSb, InPAs, InZnP, InPSb, and a mixture thereof; and a quaternary element compound selected from a group consisting of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, InZnP, and a mixture thereof. The group III-V compound may further include a group II metal (e.g., InZnP).

The group IV-VI compound may be selected from a group consisting of a binary compound selected from a group consisting of SnS, SnSe, SnTe, PbS, PbSe, PbTe, and a mixture thereof; a ternary element compound selected from a group consisting of SnSeS, SnSeTe, SnSTe, PbSeS, PbSeTe, PbSTe, SnPbS, SnPbSe, SnPbTe, and a mixture thereof; and a quaternary element compound selected from a group consisting of SnPbSSe, SnPbSeTe, SnPbSTe, and a mixture thereof.

The group IV element or compound may be selected from a group consisting of a single element compound selected from a group consisting of Si, Ge, or a combination thereof; and a binary compound selected from a group consisting SiC, SiGe, or a combination thereof, but is not limited thereto.

Examples of the group I-III-VI compound include, but are not limited to, CuInSe2, CuInS2, CuInGaSe, and CuInGaS. Examples of the group I-II-IV-VI compound include, but are not limited to, CuZnSnSe and CuZnSnS. The group IV element or compound may be selected from a group consisting a single element selected from a group consisting of Si, Ge, and a mixture thereof; and a binary compound selected from a group consisting of SiC, SiGe, and a mixture thereof The group II-III-VI compound may be selected from a group consisting of ZnGaS, ZnAlS, ZnInS, ZnGaSe, ZnAlSe, ZnInSe, ZnGaTe, ZnAlTe, ZnInTe, ZnGaO, ZnAlO, ZnInO, HgGaS, HgAlS, HgInS, HgGaSe, HgAlSe, HgInSe, HgGaTe, HgAlTe, HgInTe, MgGaS, MgAlS, MgInS, MgGaSe, MgAlSe, MgInSe, or a combination thereof, but is not limited thereto.

The group I-II-IV-VI compound may be selected from CuZnSnSe and CuZnSnS, but is not limited thereto.

In an embodiment, the quantum dot may not include cadmium. The quantum dots may contain semiconductor nanocrystals based on the group III-V compounds including indium and phosphorus. The group III-V compound may further include zinc. The quantum dot may include a semiconductor nanocrystal based on a group II-VI compound including a chalcogen element (e.g., sulfur, selenium, tellurium, or a combination thereof) and zinc.

In the quantum dot, the above-mentioned binary compound, a ternary element compound and/or quaternary compound may exist in a particle at a uniform concentration, or may exist in the same particle because the concentration distribution may be partially divided into different states. A quantum dot may have a core/shell structure surrounding another quantum dot. The interface between the core and the shell may have a concentration gradient in which the concentration of elements present in the shell decreases toward the center.

In some embodiments, a quantum dot may have a core-shell structure including a core containing the nanocrystals described above and a shell surrounding the core. The shell of the quantum dot can serve as a protective layer to maintain the semiconductor characteristic by preventing chemical denaturation of the core and/or as a charging layer to impart an electrophoretic characteristic to the quantum dot. The shell may be single-layered or multi-layered. The interface between the core and the shell may have a concentration gradient in which the concentration of elements present in the shell decreases toward the center. Examples of the shell of the quantum dot include metal or non-metal oxides, semiconductor compounds, or a combination thereof.

For example, examples of the metal or non-metal oxide may be a binary element compound such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $CO_3O_4$, NiO, and the like, or a ternary element compound such as $MgAl_2O_4$, $CoFe_2O_4$, $NiFe_2O_4$, $CoMn_2O_4$, and the like, or a combination thereof, but the disclosure is not limited thereto.

Examples of the semiconductor compound may be CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, and the like, or a combination thereof, but the disclosure is not limited thereto.

The interface between the core and the shell may have a concentration gradient in which the concentration of elements present in the shell decreases toward the center. The semiconductor nanocrystal may have a structure including a semiconductor nanocrystal core and a multi-layered shell surrounding the semiconductor nanocrystal core. In an implementation, the multi-layered shell may have two or more layers, for example, two, three, four, five, or more layers. Two adjacent layers of the shell may have a single composition or different compositions. In a multi-layered shell, each layer may have a composition that varies along the radius.

The quantum dot may have a full width at half maximum (FWHM) of the light emitting wavelength spectrum of about 45 nm or less, about 40 nm or less, or about 30 nm or less, and within this range, color purity or color reproducibility can be improved. The light emitted through the quantum dot may be emitted in all directions, and thus a light viewing angle can be improved.

In the quantum dot, the shell material and the core material may have different energy bandgaps. For example, the energy bandgap of the shell material may be greater than that of the core material. In other embodiments, the energy bandgap of the shell material may be smaller than that of the core material. The quantum dot may have a multi-layered shell. In the multi-layered shell, the energy bandgap of the outer layer may be larger than that of the inner layer (i.e., a layer closer to the core). In the multi-layered shell, the energy bandgap of the outer layer may be smaller than the energy bandgap of the inner layer.

The quantum dot may control absorption/light emitting wavelength by controlling composition and size. The maximum light emitting peak wavelength of the quantum dot may have a wavelength range of ultraviolet (UV) to infrared wavelength or higher.

The quantum dot may contain an organic ligand (e.g., having a hydrophobic moiety and/or a hydrophilic moiety. The organic ligand moiety may be bound to the surface of the quantum dot. The organic ligand moiety may include RCOOH, $RNH_2$, $R_2NH$, $R_3N$, RSH, $R_3PO$, $R_3P$, ROH, RCOOR, $RPO(OH)_2$, RHPOOH, $R_2POOH$, or a combination thereof. Here, each R may independently be a C3 to C40 substituted or unsubstituted aliphatic hydrocarbon group such as a C3 to C40 (e.g., C5 or more and C24 or less) substituted or unsubstituted alkyl, a substituted or unsubstituted alkenyl, and the like, or may be a substituted or unsubstituted aromatic hydrocarbon group of C6 to C40 (e.g., C6 or more and C20 or less), such as a substituted or unsubstituted C6 to C40 aryl group, or a combination thereof.

Examples of the organic ligand include thiol compounds such as methane thiol, ethane thiol, propane thiol, butane thiol, pentane thiol, hexane thiol, octane thiol, dodecane thiol, hexadecane thiol, octadecane thiol, and benzyl thiol; amines such as methanamine, ethanamine, propane amine, butanamine, pentylamine, hexylamine, octylamine, nonylamine, decylamine, dodecylamine, hexadecylamine, octadecylamine, dimethylamine, diethylamine, dipropylamine, tributylamine, and trioctylamine; carboxylic acid compounds such as methanic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, and benzoic acid; phosphine compounds such as methyl phosphine, ethyl phosphine, propyl phosphine, butyl phosphine, pentyl phosphine, octyl phosphine, dioctyl phosphine, tributyl phosphine, trioctyl phosphine, and the like; phosphines such as methyl phosphine oxide, ethyl phosphine oxide, propyl phosphine oxide, butyl phosphine oxide, pentyl phosphine oxide, tributyl phosphine oxide, octyl phosphine oxide, dioctyl phosphine oxide, trioctyl phosphine oxide, and the like, or an oxide compound thereof; a diphenyl phosphate spin, a triphenyl phosphate spin compound or its oxide compound; a C5 to C20 alkyl phosphinic acid or a C5 to C20 alkyl phosphonic acid such as hexylphosphonic acid, octylphosphonic acid, dodecanephosphinic acid, tetradecanphosphinic acid, hexadecanphosphinic acid, octadecanphosphinic acid; and the like, or a combination thereof. However, embodiments are not limited thereto. Quantum dots may contain hydrophobic organic ligands alone or as a mixture of more than one. The hydrophobic organic ligand (e.g., an acrylate group, a methacrylate group, and the like) may not contain a photopolymerizable moiety.

A second insulation layer P2 may be positioned on the first color conversion layer CCL1, the second color conversion layer CCL2, and the transmissive layer CCL3. The second insulation layer P2 covers and protects the first color conversion layer CCL1, the second color conversion layer CCL2, and the transmissive layer CCL3, thereby preventing foreign particles from flowing into the first color conversion layer CCL1, the second color conversion layer CCL2, and the transmissive layer CCL3. The second insulation layer P2 may be a single layer or multi-layered, and may be formed of multiple layers having different refractive indexes.

The first color filter CF1, the second color filter CF2, and the third color filter CF3 may be positioned on the second insulation layer P2.

The first color filter CF1 transmits red light that has passed through the first color conversion layer CCL1 and absorbs light of the remaining wavelength, thereby increasing the purity of the red light emitted to the outside of the display device. The second color filter CF2 transmits green light that has passed through the second color conversion layer CCL2 and absorbs light of the remaining wavelength, thereby increasing the purity of the green light emitted to the outside of the display device. The third color filter CF3 transmits the blue light that has passed through the transmissive layer CCL3 and absorbs light of the remaining wavelength, thereby increasing the purity of the blue light emitted to the outside of the display device.

A second light blocking layer BM2 may be positioned between the first color filter CF1, the second color filter CF2, and the third color filter CF3. The second light blocking layer BM2 may include a light blocking material or may have a form in which at least two of the first color filter CF1, the second color filter CF2, and the third color filter CF3 overlap.

The first color conversion layer CCL1, the second color conversion layer CCL2, and the transmissive layer CCL3 according to an embodiment may be formed using the inkjet printing apparatus IP described above.

Since the inkjet printing apparatus IP according to an embodiment can provide a uniform amount of scatterers SC over pixels or provide a uniform amount of quantum dots SN1 and SN2, a display including pixels of uniform luminance can be provided.

The display quality of the display device can be improved.

Figure 9:
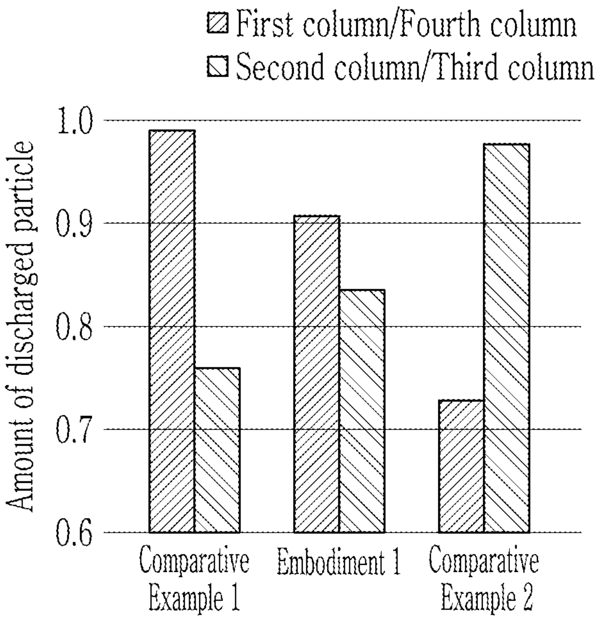
FIG. 9 and FIG. 10 are schematic graphs for a comparative example and an embodiment.
Figure 10:
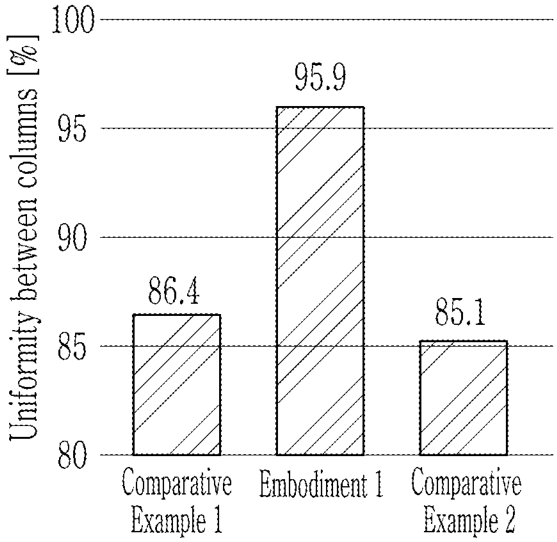

Hereinafter, an inkjet apparatus according to an embodiment will be described with reference to FIG. 9 and FIG. 10. FIG. 9 and FIG. 10 are schematic graphs for a comparative example and an embodiment.

Referring to FIG. 9 and FIG. 10, Comparative Example 1 is a case in which a damper does not include a protruding portion, and Comparative Example 2 is a case in which a height of the protruding portion may be about 0.6 mm. Embodiment 1 is a case where a height of the protruding portion may be about 0.3 mm.

Referring to FIG. 9, In the case of Comparative Example 1 where the damper does not include the protruding portion, the amount of particles discharged from the first and fourth nozzles positioned in columns 1 and 4, and the amount of particles discharged from the second and third nozzles positioned in columns 2 and 3, may be considerably different from each other. In particular, it can be observed that the amount of particles discharged from the first nozzle and the fourth nozzle may be relatively large. As shown in FIG. 10, the uniformity between columns was about 86.4%.

In the case of Comparative Example 2, opposite to Comparative Example 1, the amount of particles discharged from the second and third nozzles positioned in columns 2 and 3 may be greater than the amount of particles discharged from the first and fourth nozzles positioned in columns 1 and 4. In this case, as shown in FIG. 10, the uniformity between columns was about 85.1%.

On the other hand, in the case of Embodiment 1, the amount of particles discharged from the first and fourth nozzles positioned in columns 1 and 4 and the amount of particles discharged from the second and third nozzles positioned in columns 2 and 3 may be relatively similar compared to Comparative Example 1 and Comparative Example 2. As shown in FIG. 10, it was confirmed that the uniformity between columns was about 95.9%, which was superior to Comparative Example 1 and Comparative Example 2.

According to an embodiment, the protruding portion protruded from the damper can be disposed between the second and third nozzles positioned relatively inward, and the amount of particles contained in the ink discharged through the second and third nozzles can be adjusted through the protruding portion. In particular, it may be possible to increase the amount of particles discharged to be similar to the amount of particles contained in the ink discharged through the first nozzle and fourth nozzle, and accordingly, the uniformity of a layer formed from the inkjet printing apparatus can be improved.

While this disclosure has been described in connection with what is considered to be practical embodiments, it is to be understood that the disclosure is not limited to the disclosed embodiments. On the contrary, it is intended to cover various modifications and equivalent arrangements included within the spirit and scope of the disclosure.

What is claimed is:

1. An inkjet printing apparatus comprising:

a stage where a target substrate is disposed; and an inkjet head that discharges ink on the target substrate, wherein the inkjet head comprises:

a tank that stores the ink, nozzles that are provided on the tank and discharge the ink, and a damper that is disposed in the tank, the damper comprises a protruding portion that protrudes toward the nozzles from the damper, and the protruding portion is disposed between at least two of the nozzles.

2. The inkjet printing apparatus of claim 1, wherein a cross-section of the protruding portion has at least one of a polygonal shape, a semicircular shape, and an elliptical shape.

3. The inkjet printing apparatus of claim 1, wherein the damper comprises at least two protruding portions.

4. The inkjet printing apparatus of claim 3, wherein the at least two protruding portions have different heights.

5. The inkjet printing apparatus of claim 4, wherein the nozzles comprise:

first nozzles disposed in a first column, second nozzles disposed in a second column, third nozzles disposed in a third column, and fourth nozzles disposed in a fourth column.

6. The inkjet printing apparatus of claim 5, wherein the at least two protruding portions comprise:

a first protruding portion disposed between the first nozzle and the second nozzle, a second protruding portion disposed between the second nozzle and the third nozzle, and a third protruding portion disposed between the third nozzle and the fourth nozzle.

7. The inkjet printing apparatus of claim 6, wherein a height of the second protruding portion is higher than a height of the first protruding portion and a height of the third protruding portion.

8. The inkjet printing apparatus of claim 5, wherein the first nozzle, the second nozzle, the third nozzle, and the fourth nozzle are disposed in a first direction, the protruding portion extends in a second direction, and the first direction and the second direction are perpendicular.

9. The inkjet printing apparatus of claim 8, wherein the protruding portion comprises sub-protruding portions spaced apart from each other in the second direction.

10. The inkjet printing apparatus of claim 1, wherein the damper comprises:

a first region overlapping the nozzles and a second region other than the first region, and the first region and the second region form a step difference.

11. An inkjet printing apparatus comprising:

a stage where a target substrate is disposed; and an inkjet head that discharges ink on the target substrate, wherein the inkjet head comprises:

a tank that stores the ink, nozzles that are provided on the tank and discharge the ink, and a damper provided in the tank and overlapping nozzles, the damper comprises a protruding portion protruded from a surface of the damper, and the protruding portion is disposed between at least two of the nozzles.

12. The inkjet printing apparatus of claim 11, wherein a cross-section of the protruding portion has at least one of a polygonal shape, a semicircular shape, and an elliptical shape.

13. The inkjet printing apparatus of claim 11, wherein the damper comprises at least two protruding portions.

14. The inkjet printing apparatus of claim 13, wherein the at least two protruding portions have different heights.

15. The inkjet printing apparatus of claim 14, wherein the nozzles comprise:

first nozzles disposed in a first column, second nozzles disposed in a second column, third nozzles disposed in a third column, and fourth nozzles disposed in a fourth column.

16. The inkjet printing apparatus of claim 15, wherein the protruding portion comprises:

a first protruding portion disposed between the first nozzle and the second nozzle, a second protruding portion disposed between the second nozzle and the third nozzle, and a third protruding portion disposed between the third nozzle and the fourth nozzle.

17. The inkjet printing apparatus of claim 16, wherein a height of the second protruding portion is higher than a height of the first protruding portion and a height of the third protruding portion.

18. The inkjet printing apparatus of claim 15, wherein the first nozzle, the second nozzle, the third nozzle, and the fourth nozzle are disposed in a first direction, the protruding portion extends in a second direction, and the first direction and the second direction are perpendicular.

19. The inkjet printing apparatus of claim 18, wherein the protruding portion comprises sub-protruding portions spaced apart from each other in the second direction.

20. The inkjet printing apparatus of claim 11, wherein the damper comprises:

a first region overlapping the nozzles and a second region other than the first region, and the first region and the second region form a step difference.

* * * * *